J. S. BALDWIN.
Method of Preserving and Storing Carbonic Acid Gas.
No. 55,039. Patented May 29, 1866.
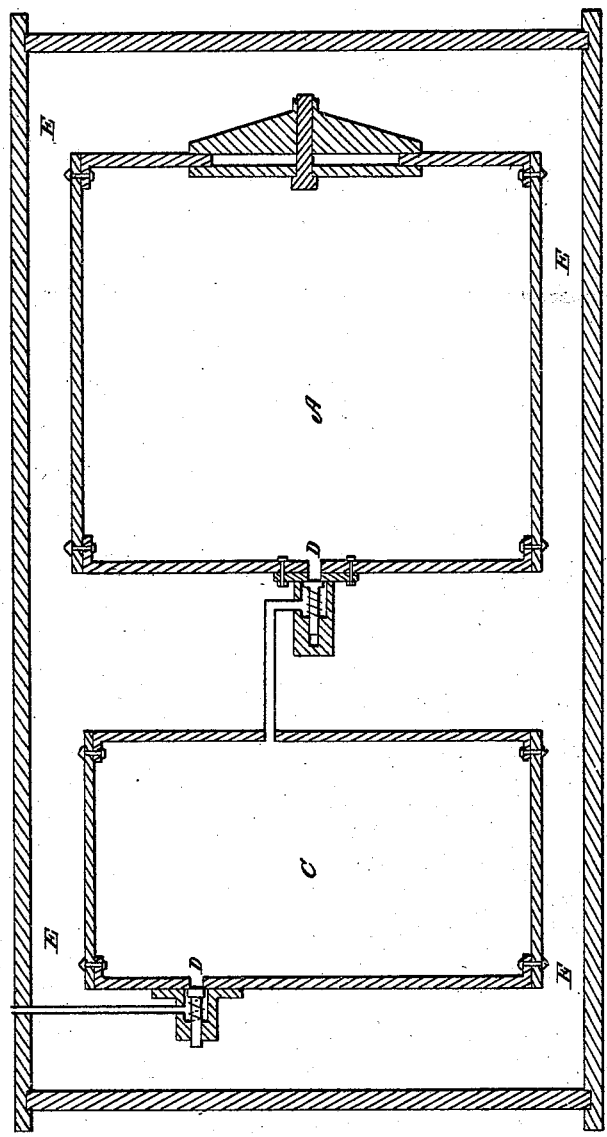

UNITED STATES PATENT OFFICE.

JAMES S. BALDWIN, OF NEW YORK, N. Y.

IMPROVED METHOD OF PRESERVING AND STORING CARBONIC-ACID GAS.

Specification forming part of Letters Patent No. 55,039, dated May 29, 1866.

*To all whom it may concern:*

Be it known that I, JAMES S. BALDWIN, of the city, county, and State of New York, have discovered or invented a new and Improved Mode of Preserving and Storing away for Use Carbonic Acid; and I hereby declare that the following is a full and sufficient description thereof, reference being had to the accompanying drawing and references, making a part of this description.

It is proposed to effect the preservation of solid carbonic acid prepared in any suitable way and prevent the escape of the gas produced by volatilization by inclosing it in vessels made air-tight and surrounded by suitable non-conductors, in combination with a second vessel or vessels containing any substance capable of absorbing or combining with the gas produced by volatilization of the solid carbonic acid, as herein named.

In the annexed drawing, A represents a cylindrical vessel with strong metallic plates, containing the solid carbonic acid, from which the gas escapes, as it is vaporized, through the valve B, which is controlled by a steel spring so arranged as to be adjustable to any desired pressure greater or less than that of the atmosphere, the gas passing thence from vessel A to vessel C, which contains a substance which I call an "absorbent." For this purpose I use caustic lime or caustic soda. I might use any other alkaline or metallic base, or earthy base, as an equivalent therefor. The spring-valve D permits the surplus gas to escape in case there should be a surplus accumulated, which will not often happen. It prevents the entrance of the atmospheric air, if it be desired to maintain a vacuum within the apparatus. It may be adjusted to any desired pressure. The space E E E E is filled with any suitable non-conductor of heat, which may be fibrous matter, as cotton, wool, or any equivalent thereof.

To prepare the cylinder C with the absorbent the absorbing material is arranged in such a manner as to present an extensive surface either by breaking it into small fragments or by saturating some fibrous substance with the absorbent, to be used either wet or dry.

In some cases the absorbent is used in the vessel A by occupying a partition space separated from the mass of the carbonic acid by a septum or diaphragm, either with or without the spring-valve B, in which case the partitioned space of vessel A is regarded as the equivalent of vessel C.

What I claim as my invention, and desire to secure by Letters Patent, is—

The combination of vessel A with vessel C, or the equivalent thereof, arranged and prepared substantially in the manner and for the purpose herein set forth.

JAMES S. BALDWIN.

Witnesses:
WM. H. RIBLET,
L. D. GALE.